Figure 1:
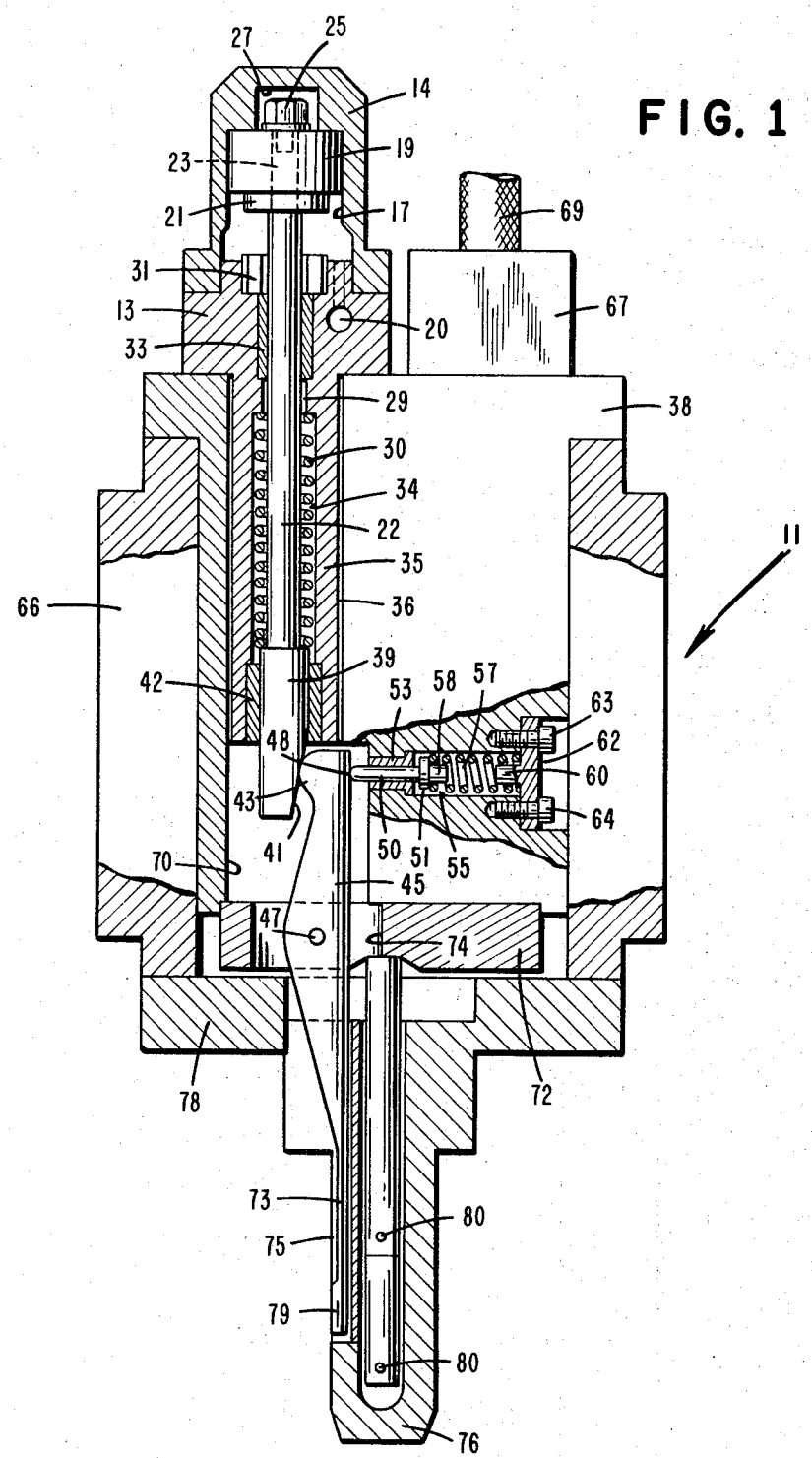

United States Patent [19]  [11] 3,834,532
Solaroli  [45] Sept. 10, 1974

[54] DEVICE FOR TRANSPORT AND GAUGING OF MECHANICAL PIECES PARTICULARLY USED ON AUTOMATIC MEASURING MACHINES

[75] Inventor: Sergio Solaroli, Bologna, Italy
[73] Assignee: Finike Italiana Marposs-Soc. In Accomandita Semplice di Mario Possati & C.
[22] Filed: May 9, 1973
[21] Appl. No.: 358,596

[30] Foreign Application Priority Data
May 9, 1972 Italy .................................. 3419/72

[52] U.S. Cl. .................................. 209/82, 294/97
[51] Int. Cl. ............................................ B07b 13/04
[58] Field of Search ................... 209/80, 82, 73, 74; 294/97

[56] References Cited
UNITED STATES PATENTS
2,713,419  7/1955  Hayes ............................ 209/82 UX Primary Examiner—Allen N. Knowles
Attorney, Agent, or Firm—Stevens, Davis, Miller & Mosher

[57] ABSTRACT

A device for transporting and size gauging of mechanical pieces which includes a mechanical arm for the support and displacement of a piece grasping and measuring unit which is constituted of a measuring means defining a plug with feelers and a grasping unit formed of grasping elements movable by corresponding operating means to an operating position and back to a rest position. The grasping elements are composed of at least one shaped rod pivoted on a plug supporting shell and having an end inserted in the plug provided with mechanical piece hooks facing an opening of the plug with the rod cooperating with a first pushing element to pivot into contact with the mechanical piece. The rod also cooperates with a second pushing element which biases the rod to a position of rest.

4 Claims, 4 Drawing Figures

3,834,532

DEVICE FOR TRANSPORT AND GAUGING OF MECHANICAL PIECES PARTICULARLY USED ON AUTOMATIC MEASURING MACHINES

The present invention relates to a device generally used on automatic measuring machines, fitted for the transport of mechanical pieces and for the gauging of their sizes.

In many types of automatic measuring machines the piece is drawn from a loading station by means of a mechanical arm and brought to a measuring station provided with one or more measuring devices.

The mechanical arm is then removed, to allow the measuring devices to approach the piece, in order to carry out the required size gauging. In turn, the measuring devices are removed, the mechanical arm is again utilized to pick up the piece and take it to the various output stations.

It is therefore clear that the succeeding operations this mechanical arm has to perform in order to bring the piece to the measuring station and to draw and send it to the different output stations after gauging excessively influence the machining times.

Besides, due also to the scarce accessibility of the piece and to the necessity of limiting overall dimensions, the manufacturing of this conveying arm in some cases is technically sophisticated and therefore expensive.

The technical problem the present invention intends to solve is to provide a device which, besides carrying out size gauging of the pieces, is designed to lift them from the loading station and to transport them to the different output stations to obtain a selection of the pieces gauged. The problem is solved by a device which transports and size gauges, by means of feelers of mechanical pieces, particularly for automatic measuring machines provided with loading, measuring and output stations. The device, according to the present invention, comprises a mechanical arm for support and displacement of a piece grasping and measuring unit towards the stations. This unit includes measuring means, known per se, and a grasping unit formed by moving grasping elements by corresponding operating means, the operating means being designed to bring said grasping elements to a working position, and to return them to a rest position, the measuring means being in turn designed to perform the size gauging of the pieces.

The following description concerns preferential embodiments of the device according to the present invention, given by way of a non-limiting example, with reference to the enclosed drawings, in which equal or equivalent parts are marked with the same reference numerals.

Figure 2:
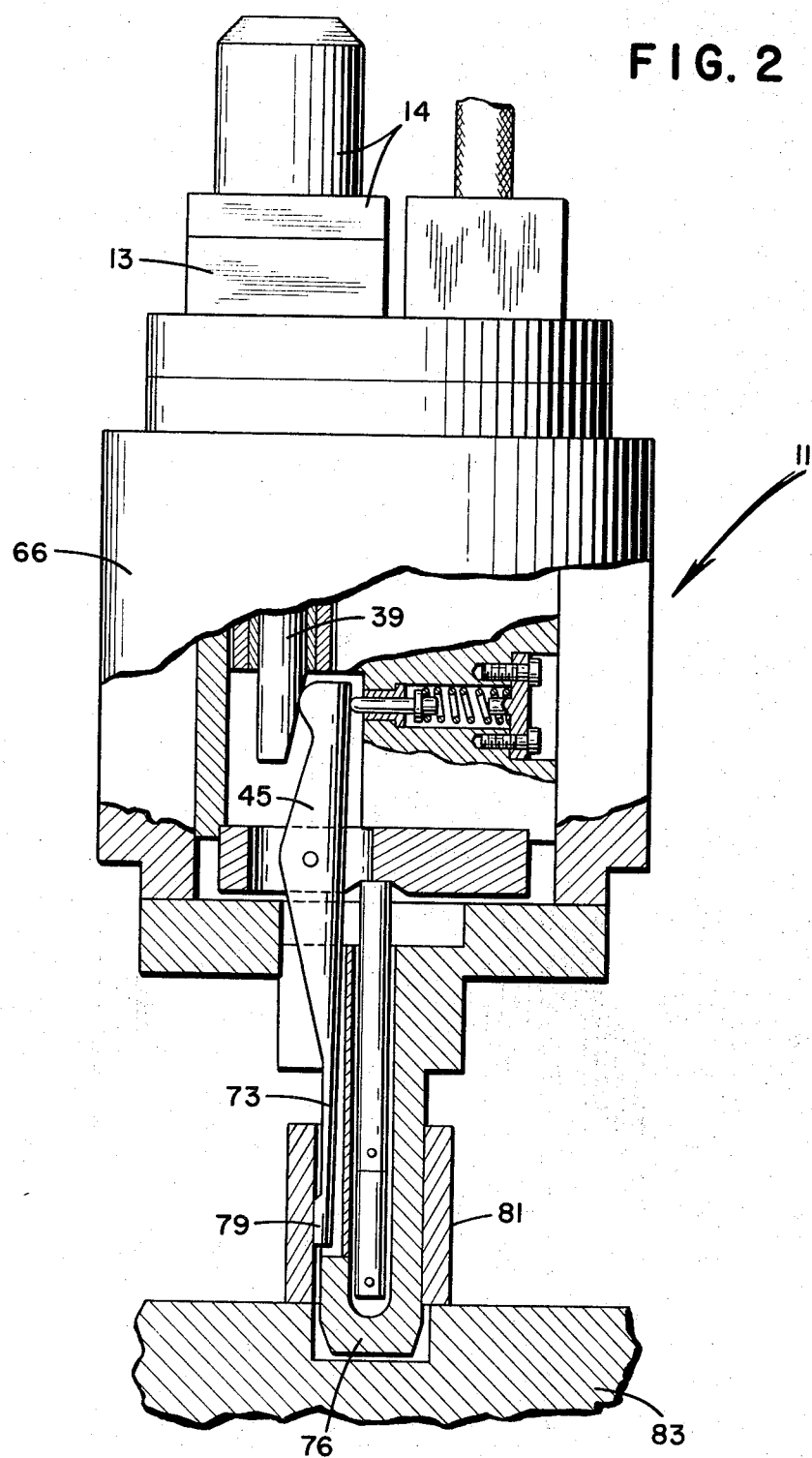
Figure 3:
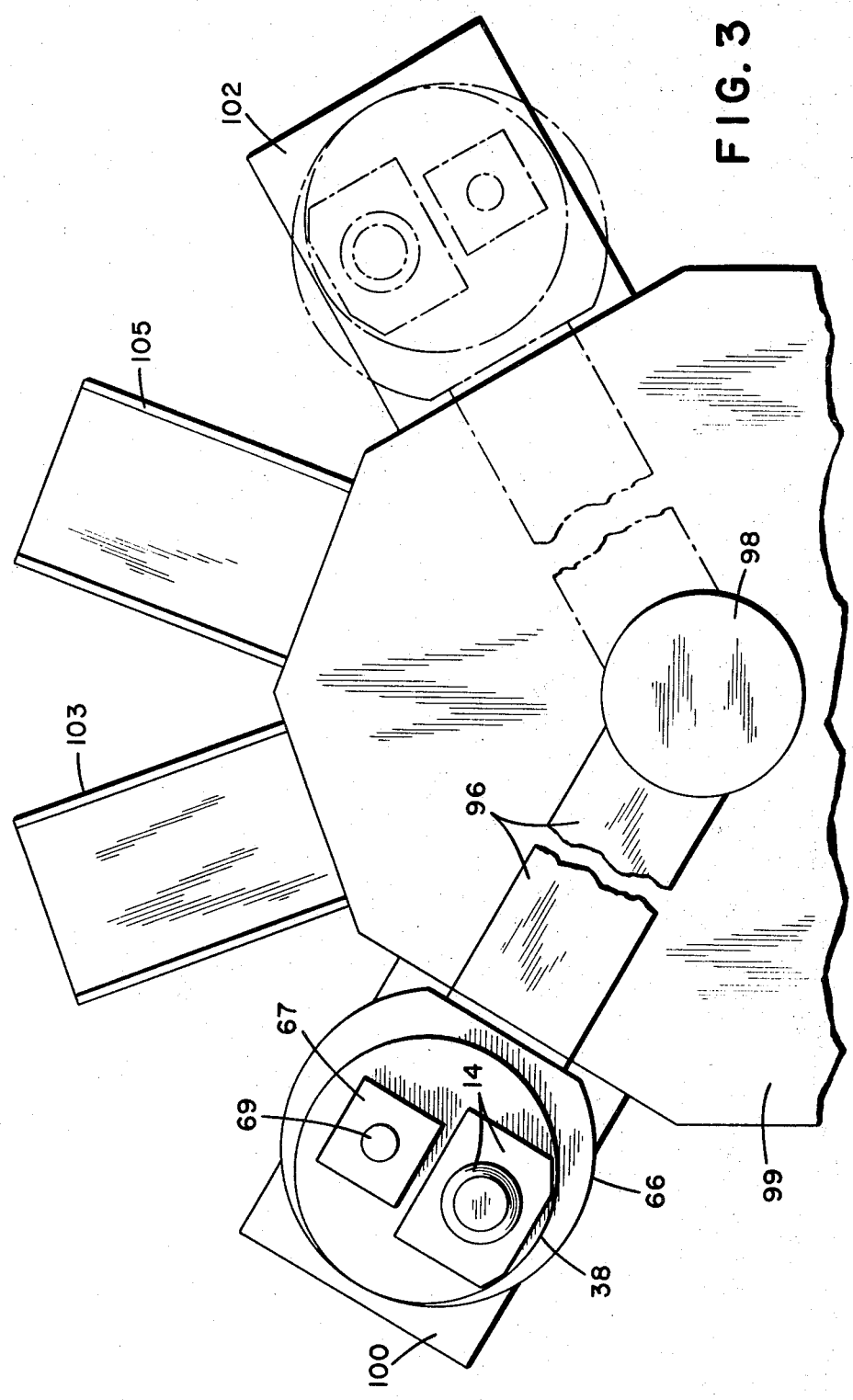
Figure 4:
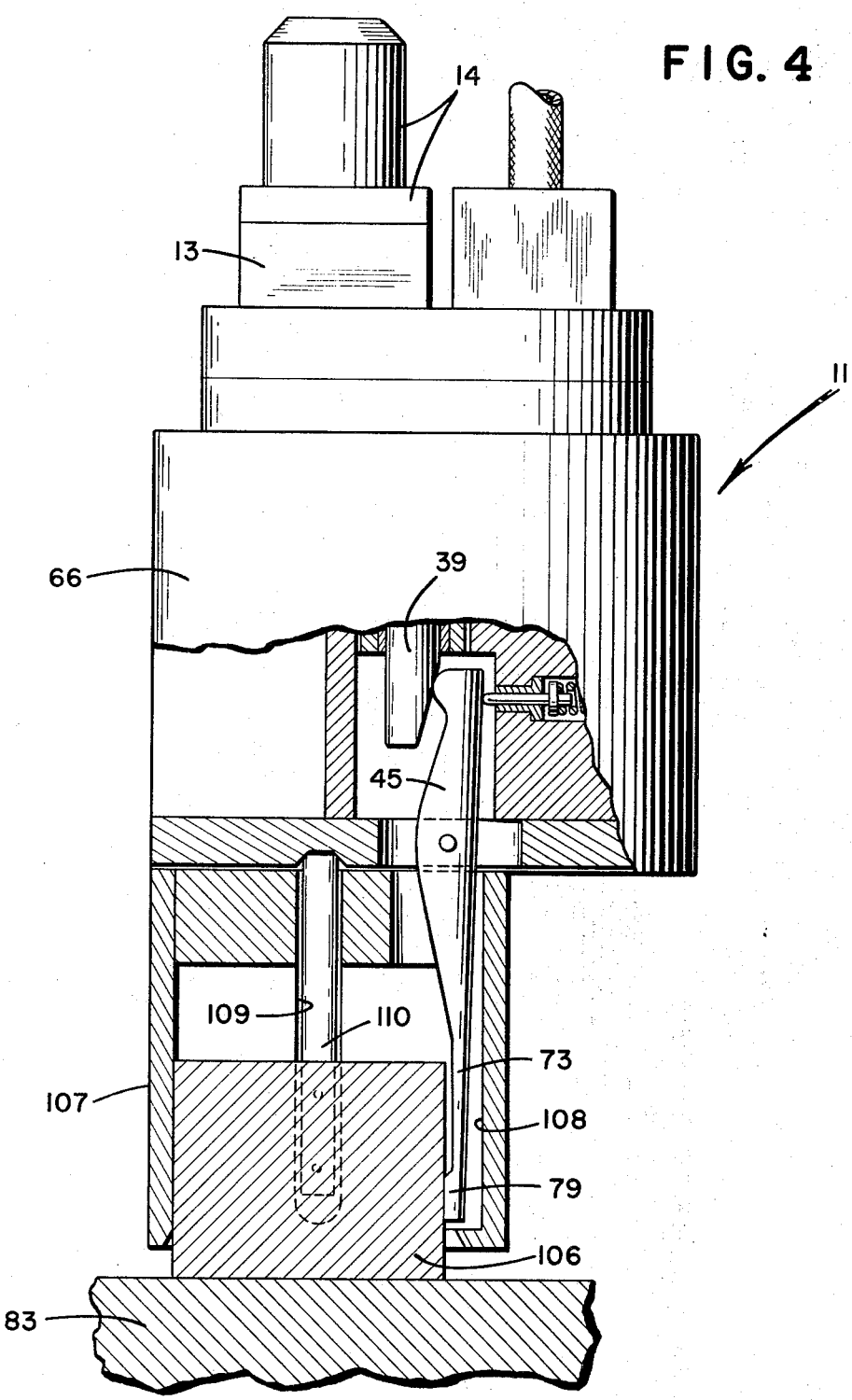

FIG. 1 shows schematically a partly sectioned view of a device according to the present invention, FIG. 2 shows a partly sectioned view of a detail of the device of FIG. 1, FIG. 3 shows a schematic top view of the device of FIGS. 1 and 2, applied to a measuring automatic machine, and FIG. 4 shows schematically another device which is also made according to the present invention.

With reference to FIGS. 1 and 2, 11 indicates a measuring plug unit comprising a cylinder 14 provided with a cylindrical chamber 17 into which compressed air is fed through an opening 20.

A piston 19 slides in chamber 17 and is provided with a ledge washer 21. The piston 19 is fastened to a shaft 22 ending at the top with a stem 23 to which a supporting nut 25 is tightened.

The nut 25 is housed in a seat 27 in cylinder 14. Shaft 22 slides in a ring nut 31 which is tightened on a bored body 13 connected with cylinder 14. Ring nut 31 abuts a sealing bushing 33.

The shaft 22 slides in a hole 29 of cylindrical element 35 within body 13.

In bore 34 of element 35 there is a pressure spring 30 which biases cylindrical body 39 connected to the lower end of shaft 22 in a downward direction. The element 35 in turn is placed in a seat 36 at the inner side of a shell structure 38.

Body 39 is surrounded by bushing 42 and has a flat bevel 41 in contact with a lobe 43 provided at the end of a shaped rod 45 which is a grasping element. Opposite to lobe 43, a face 48 of rod 45 cooperates in turn with a shaft 50 provided with a ledge washer 51. Shaft 50 slides in a bushing 53 and in a cylindrical bore 55 of the structure 38.

Furthermore, shaft 50 is forced against face 48 by the action of a pressure spring 57 whose ends are placed over two projections 58 and 60. Projection 58 is a part of shaft 50 projecting beyond washer 51, whereas projection 60 is connected to a disk 62 tightly fixed by two nuts 63 and 64 to the shell structure 38. Furthermore, to structure 38 are connected a protection crown 66 and a sleeve 67.

A cable 69 passing through sleeve 67 contains wires (not illustrated in the figure) to feed the position transducers (not shown) and to draw the measuring signal.

Lobe 43 of rod 45 is placed in a hollow 70 of structure 38. Rod 45 is hinged on a pivot 47, whose ends rest on a body 72 tightly fixed to structure 38. Body 72 is provided with a slot 74. The lower end of rod 45 forms an arm 73 positioned within a hollow 75 of plug 76 joined to a flange 78 associated with crown 66. Arm 73, in turn, is provided with a fin 79 to hook the bored piece 81 (FIG. 2), to be controlled, which is placed on a supporting plate 83. The size gauging on the piece 81 is made by means of an appropriate series of feelers 80, which in a known way, not illustrated by the drawings, control a corresponding series of position transducers, (already cited above) adapted to detect the size of the hole of the examined piece 81.

The measuring plug unit 11 is supported by an arm 96 (FIG. 3) connected to a shaft 98, revolving on a steel bed 99 and displaceable by known systems with a direction perpendicular to the bed itself.

Bed 99, moreover, is provided with a loading station 100, on which, in a known way, not illustrated in the figure, the pieces to be controlled are placed, with a measuring station 102, in which the control means makes the required size gauging, and with two output stations 103 and 105, giving a selection of the pieces gauged by the measuring station 102.

The device operates as follows.

By means of an adequate rotation of shaft 98 plug unit 11 is brought to the loading station 100.

At this time, piston 19 is brought to the position of FIG. 1, in contact with the base of the cylinder 14, by being pushed upwards by air under pressure contained in the chamber 17. Spring 30 is thereby compressed. The position of bevel 41 allows rod 45 to remain in a vertical position by the action of shaft 50, pushed by spring 57.

The fin 79 is placed in plug 76, without projecting therefrom.

Shaft 98 is then appropriately driven so that plug unit 11 is lowered onto piece 81.

When plug 76 has entered the hole to be measured, the pressure in the chamber 17 is decreased to allow piston 19, shaft 22 and cylindrical body 39 to move downwards.

Bevel 41 acts on the lobe of rod 45, and causes a clockwise rotation of rod 45 about pivot 43, against the action of spring 57. The downward movement of shaft 22 and body 39 stops when fin 79, as a result of the rotation of rod 45 on pivot 47, extends from plug 76 and comes into contact with piece 81.

Shaft 98 is driven upwards, so that plug unit 11 is lifted and piece 81, retained by fin 79, follows the movement of plug 11.

A subsequent rotation of shaft 98 brings plug unit 11 to position the piece 81 on a supporting plate 83.

This position is shown by FIG. 2, in which, to make representation easy, the clearance between piece 81 and plug 76 and the displacement undergone by fin 79 are exaggerated.

Compressed air is introduced again into chamber 17 of plug unit 11 to cause the upward movement of piston 19, shaft 22 and body 39.

Bevel 41 follows the upward movement of body 39 and permits rod 45 to revolve freely in a counterclockwise direction by the action of spring 57. As a result, fin 79 loses contact with piece 81 and retracts into plug 76.

At this time, plug unit 11 is ready to measure the hole of piece 81. Other contemporary controls can be carried out, by means of adequate measuring instruments, (not shown in the figure).

As a matter of fact, the accessibility of piece 81 is not limited at all by the presence of the grasping devices, since the latter are internal to the measuring plug unit 11.

After gauging the required size, pressure in chamber 17 is decreased again and piece 81 is hooked by fin 79 in the way described above. Shaft 98 is moved upwards and then revolved, to bring plug unit 11 onto the corresponding output station.

Then shaft 98 is lowered to allow plug unit 11 to position piece 81 on the supporting plate of the output station, selected in a known way on the basis of the detected sizes.

A subsequent inlet of compressed air into chamber 17 causes the removal of fin 79 from piece 81 which is on the respective supporting plate.

Shaft 98 is hoisted again and then revolved to bring the plug to the loading station, in order to draw another piece.

For every piece to be gauged, the succeeding drawing and controlling operations take place in the way described above.

It is clear that, that if the only control which has to be performed is of the hole of piece 81 the machine of FIG. 3 can be manufactured without any measuring station 102, because the control of the hole can be directly made in the loading station 100.

The application of the device according to the present invention is not to be considered as limited to the transport and control of bored pieces. The device shown in FIGS. 1 and 2 by simple changes also can be used for grasping, transporting and size gauging pieces of other types.

For example, the device shown in FIG. 4 is adapted to transport cylindrical pieces 106, even if they are not bored, and to measure their outside diameter.

In this case, the device includes a hose 107 which, in cooperation with the arm 73 of rod 45, carries out the grasping of the piece 106. Arm 73 is placed in a hollow 108 of hose 107; in other hollows 109, feelers 110 are positioned.

What is claimed is:

1. A device for the transporting and size gauging, by means of feelers of mechanical pieces, in automatic measuring machines provided with loading, measuring and output stations, comprising a mechanical arm for the support and the displacement towards said stations of a piece grasping and measuring unit, said unit being constituted of a measuring means comprising a plug endowed with feelers and a grasping unit formed of grasping elements movable by corresponding operating means, said operating means moving said grasping elements to an operating position and back to a rest position.

2. The device according to claim 1 for transporting and size gauging of bored mechanical pieces in which said grasping elements are formed by at least one shaped rod pivoted on a plug supporting shell and having an end inserted in said plug, provided with piece hooking means facing an opening of said plug, said shaped rod cooperating with one first pushing element associated with said operating means to allow the rod to pivot into contact with the mechanical piece.

3. The device according to claim 2, in which said rod cooperates with a second pushing element biasing the rod to a position of rest.

4. The device according to claim 2, in which said first pushing element is formed by a cylindrical body having a beveled surface in contact with a lobe of said shaped rod, said cylindrical body being integral with a shaft axially movable by the action of a cylinder-piston system.

* * * * *